United States Patent

Brizzolesi

[15] 3,668,891

[45] June 13, 1972

[54] FLEXIBLE COUPLINGS
[72] Inventor: Gustavo Brizzolesi, Milan, Italy
[73] Assignee: Societa Applicazioni Gomma Antivibranti "SAGA" S.p.A., Milan, Italy
[22] Filed: Sept. 30, 1970
[21] Appl. No.: 76,924

[30] Foreign Application Priority Data

Jan. 17, 1970 Italy..................................19482 A/70

[52] U.S. Cl.....................................................64/12, 64/13
[51] Int. Cl..........................................................F16d 3/62
[58] Field of Search...................................................64/12, 13

[56] References Cited

UNITED STATES PATENTS 1,595,412  8/1926   McCoy et al. ...........................64/13
2,784,575  3/1957   Jencick......................................64/13
2,837,901  6/1958   Chapman...................................64/12

Primary Examiner—Kenneth W. Sprague
Attorney—Sughrue, Rothwell, Mion, Zinn & Macpeak

[57] ABSTRACT

A flexible transmission coupling comprises an annular resilient member made up from a number of small resilient plates joined end to end to form a ring. The shafts to be coupled are each formed with a fork or tripod at their ends and these are bolted to the ring at the junctions of the plates so that their ends are circumferentially displaced from one another. The plates have a stepped configuration with parallel end portions displaced from one another in a direction normal to the plane of the plates and incorporate a loop of reinforcing wire in the shape of a figure of eight.

6 Claims, 5 Drawing Figures

FLEXIBLE COUPLINGS

This invention refers to flexible transmission couplings of the type comprising a resilient annular member to which a drive shaft and a driven shaft are connected by means of substantially radial arms carried by each shaft.

In particular this invention relates to flexible couplings having an annular body of resilient material provided with metal sockets for fixing bolts which connect the annular body to the ends of the two shafts. Reinforcing elements of metal wire between adjacent sockets are frequently provided on couplings of this type.

According to the present invention there is provided a flexible coupling for transmitting torque between two shafts, the coupling being of the type formed by a resilient annular member provided with metal sockets for receiving bolts by means of which the ends of the two shafts can be connected to respective parts of the annular member and incorporating reinforcing elements comprising metal wires extending at least between adjacent sockets, in which the resilient annular member comprises a plurality of resilient plates of stepped configuration having parallel end portions displaced from one another in a direction normal to the plane of the plates, the plates being joined end to end with one of the said metal sockets at each junction between adjacent resilient stepped plates, one of the said resilient plates extending between each pair of adjacent sockets, and each reinforcing wire being in the form of a closed loop in the shape of a figure of eight.

A flexible coupling of this type provides improved flexibility allowing the shafts to be at a substantial angle to one another and at the same time has an improved resistance to wear over conventional flexible couplings.

Various embodiments of the invention will now be described, by way of example, with reference to the accompanying drawings, in which.

Figure 1:
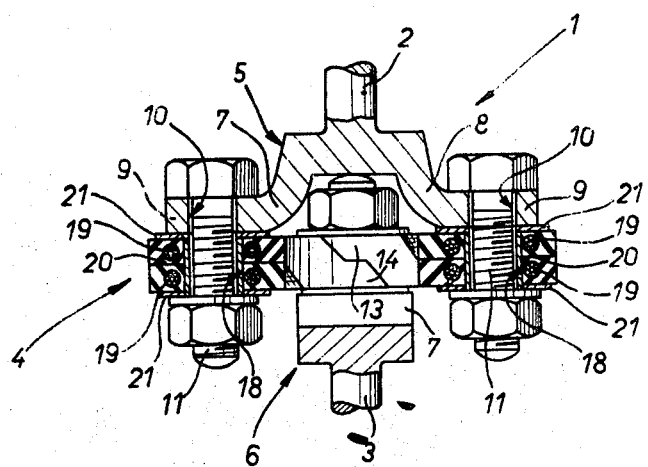
FIG. 1 is an axial section of a side elevation of one embodiment of a flexible coupling according to this invention.

Referring now to FIG. 1, a resilient joint generally indicated by the numeral 1 is shown comprising two shafts 2 and 3, respectively a driving shaft and a driven shaft each connected to a flexible coupling, 4.

For this purpose the shafts 2 and 3 respectively carry bosses 5 and 6 each of which have two arms 7 and 8 disposed in the same plane transverse the direction of the respective shafts 2 or 3. The arms 7 and 8 of each boss are connected to the flexible coupling by means of bolts which pass through an aperture, 10 in the end of each arm 7, 8. The arms 7, 8 of each boss 5, 6 are connected to the flexible coupling 4 so as to be perpendicular to one another.

The flexible coupling 4 is formed by four small resilient plates 12, each of which is formed by two end portions, 13 and 14 respectively connected to each other by a central portion 15.

The end portions 13 and 14 are parallel to each other and displaced from each other in a direction normal to the plane of the plate. The central portion 15 of each small plate 12 presents inclined surfaces 16 connecting the faces of the two end pieces 13 and 14 to one another. The end portions 13 and 14, are rounded at their ends 17 and each end has an aperture 18.

Incorporated within each small plate 12 is a metal wire 19 closed as a loop and bent so as to form the shape of a figure of eight. The metal wire 19, formed preferably of brazed metal strands is formed within each small plate 12 so that the two twists formed by it surround the two apertures 18 of the end pieces 13 and 14. The loop of the metal wire 19 which is in the shape of a figure of eight overlaps in the region of the central piece 15 which is narrower than the end pieces 13 and 14.

In order to form the flexible coupling 4, four small plates 12 are connected to one another overlapping the end portion 13 of one small plate to the end portion 14 of the adjacent small plate 12 and placing the apertures 18 of the overlapped end portions 13 and 14 in line with each other. A cylindrical metal socket 20 having a slightly greater height than that of the overlapped end portions 13 and 14 of two small successive plates 12 is then inserted into the apertures 18. Two flanges 21 are then formed, one at each end of the socket 20, which rest on the outside surfaces of the overlapped end portions 13 and 14 of the plates 12. Bolts 11 are passed through the cylindrical sockets 20 and the arms 7, 8 of the bosses 5 and 6 are bolted to the flexible coupling 4.

Figure 2:
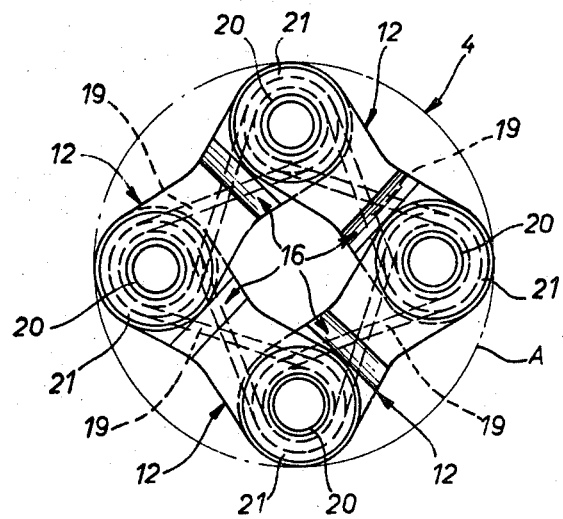
FIG. 2 is a plan view of the embodiment of FIG. 1.

In FIGS. 1 and 2, the flexible coupling 4 is formed by four small plates 12 which form a square.

Figure 3:
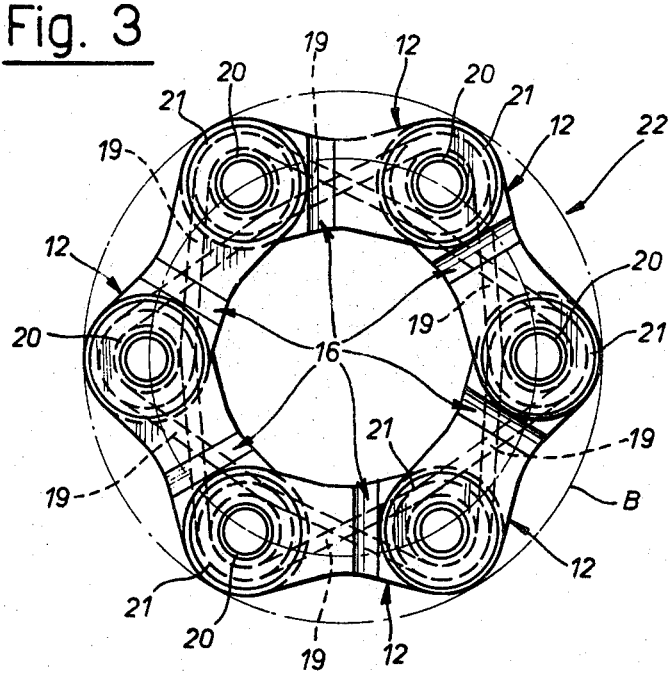
FIG. 3 is a plan view of a second embodiment of this invention.
Figure 4:
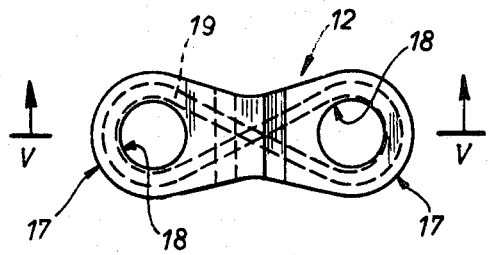
FIG. 4 is a plan view of one of the plates forming the resilient annular member illustrated in FIGS. 1 and 2.
Figure 5:
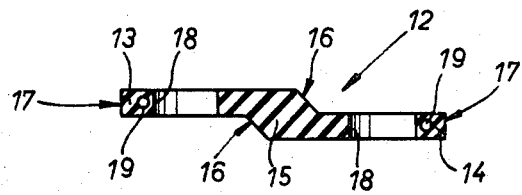
FIG. 5 is a section on the line V — V of FIG. 4.

The embodiment shown in FIG. 3 is a flexible coupling in which sex small plates 12 are used. The plates 12 are connected to one another in the same manner as described above in relation to FIG. 1.

The six small plates 12 forming the flexible coupling 4 form a hexagon.

In practice it has been found that the flexible couplings of this invention are definitely superior to conventional couplings of this type particularly when the transmission of torque is between shafts at a substantial angle to one another.

One advantage of flexible couplings constructed in accordance with this invention is that of being made of standard elements which can be made up into various forms in order to construct flexible couplings with four, six or more sockets for the elastic connection of end frames of shafts provided with two, three or more arms.

What is claimed is:

1. A flexible coupling for transmitting torque between two shafts,
    said coupling comprising a resilient annular member,
    metal sockets provided on said resilient annular member,
    bolts provided on said shafts by means of which the ends of said shafts can be connected to respective parts of said annular member,
    reinforcing elements incorporated in said annular member, said reinforcing elements comprising metal wires extending at least between adjacent said sockets,
    said resilient annular member comprising a plurality of resilient plates of stepped configuration having parallel end portions displaced from one another in a direction normal to the plane of the plates,
    said plates being joined end to end with one of said metal sockets at each junction between adjacent said resilient stepped plates, one of the said resilient plates extending between each pair of adjacent said sockets, and each said reinforcing wire being in the form of a closed loop in the shape of a figure of eight.

2. The flexible coupling of claim 1, wherein the step formed in each plate presents inclined surfaces with respect to the general plane of said resilient annular member.

3. The flexible coupling of claim 1, wherein said ends of each plate are rounded and have an aperture through which said socket passes, said aperture being at least partially surrounded by said loop of reinforcing metal wire.

4. The flexible coupling of claim 1, wherein said step in each plate has a width smaller than that of said end portions.

5. The flexible coupling of claim 1, wherein said resilient annular member is formed by four said plates connected to one another by said metal sockets.

6. The flexible coupling of claim 1, wherein said resilient annular member is formed by six or more said plates connected to one another by said metal sockets.

* * * * *